United States Patent [19]

Bauer

[11] 4,218,116
[45] Aug. 19, 1980

[54] EQUIPMENT IN FILM CAMERAS

[76] Inventor: Fritz G. Bauer, Loquaiplatz 13, A-1060 Vienna, Austria

[21] Appl. No.: 961,702

[22] Filed: Nov. 17, 1978

[51] Int. Cl.² .......................................... G03B 31/00
[52] U.S. Cl. .................................................. 352/22
[58] Field of Search ............................. 352/22, 23, 24

[56] References Cited

U.S. PATENT DOCUMENTS

| | | | |
|---|---|---|---|
| 3,188,929 | 6/1965 | Higonnet et al. | 354/6 |
| 3,820,076 | 6/1974 | Butts | 353/27 X |
| 3,826,566 | 7/1974 | Csontos | 352/23 X |
| 3,838,435 | 9/1974 | Mepham et al. | 354/109 |
| 4,050,793 | 9/1977 | Hoadley . | |

FOREIGN PATENT DOCUMENTS 2412492 10/1974 Fed. Rep. of Germany .
574622 2/1976 Switzerland .
1262118 2/1972 United Kingdom .

Primary Examiner—Michael L. Gellner
Attorney, Agent, or Firm—Kurt Kelman

[57] ABSTRACT

An accessory apparatus for producing visible information on a film in a moving picture camera by exposure of the film through optical indicating elements comprises an actuating circuit arrangement for the optical indicating elements. The circuit arrangement includes a driving circuit for actuating the indicating elements and a control circuit associated with the driving circuit. The driving circuit is responsive to the control circuit and the control circuit is controllable in response to the picture frequency of the camera. It comprises an electrical signal transmitting stage, a signal recording stage connected to the transmitting state and directly receiving the signal therefrom, the driving circuit and the signal transmitting stage being energizable simultaneously, and a blocking circuit stage de-energizing the control circuit after passage of a pre-selectable number of picture frames after the standard picture frequency has been reached.

4 Claims, 7 Drawing Figures

EQUIPMENT IN FILM CAMERAS

BACKGROUND OF THE INVENTION

1. Field of the Invention

The invention relates to an accessory apparatus on moving picture cameras for focusing information.

2. Description of the Prior Art

In general, a "shutter" is used for numbering film scenes and for the synchronous marking of the film camera and sound recording instrument. This "shutter" is comprised of a black board on which the number of the scene to be filmed is written in chalk. A ledge is affixed to the lower edge of the shutter by a hinge to enable it to be knocked against the board. The "shutter" is placed in front of the camera. On direction "sound away" and "picture away", the sound recording instrument and camera are started. Thus, the camera films the "shutter" with the number on it. Thereupon, the assistant announces the number for the sound, and the ledge at the lower edge of the board is knocked against the surface. The resultant knock is received by the sound recording instrument as the camera has filmed the event. The reason for this measure is that the number of the scene can be read in the projection or on the cutting table and can be heard simultaneously on the sound track and the scenes may be placed on the cutting table in case of sound-synchronized pictures, i.e. the optical signal of the picture sample (impact of the ledge on the lower edge of the shutter) and the acoustical signal (knock) on the perforated band may be brought into registry on the cutting table, which assures that in this scene the picture and sound will be synchronized.

The knocking of the shutter is replaced in some cases by a light shutter. In this case, a small light on the shutter is connected with the sound recording instrument. The sound recording master actuates the switch, the small light lights up and the sound track is marked simultaneously.

These shutter systems have various disadvantages.

The knocking of the shutter, including the direction, takes 10–15 sec. Another few seconds pass until the scene begins because the person operating the shutter must leave the picture. Furthermore, it is frequently necessary to turn or even to pivot.

Thus, solely for numbering the scene with this known "shutter knocking", about 8–10 meters of raw film is used up. In this manner, 10 to 25% of the entire raw film material needed is used up for shutter knocking. Furthermore, a special operator must be provided at the filming for the shutter knocking.

SUMMARY OF THE INVENTION

It is known in moving picture cameras to focus information on the film material by exposure through optical indicating elements but to solve the synchronous marking of the shutter text as well as of an acoustical signal associated with the shutter in as safe and efficient a manner as possible has not been accomplished. This is the object of the present invention.

In an accessory apparatus on moving picture cameras for focusing information on the film material by exposure through optical indicating elements which are controllable by a circuit arrangement, this invention provides a circuit arrangement for the control of the indicating elements comprising a circuit for transmitting signals to a sound recorder which is controllable simultaneously with the circuit element operating actuation of the indicating elements.

In this manner, the film material is exposed fully automatically with the "shutter text" set by the encoding switch accessible on the operating panel of the camera. The advantage is that the use of raw film otherwise required for the numbering of the scenes is substantially reduced, for example from 15 sec. to 1 sec., that no special assistant is required for operation of the shutter, that the scene numbers are always of the same size in the picture, that the camera is ready immediately for filming the scene after the number has been marked, that the splicing of the film on the cutting table can be made "at the beginning" as well as "at the end".

BRIEF DESCRIPTION OF THE DRAWING

The invention is explained hereinbelow by way of example in conjunction with the drawings.

DESCRIPTION OF THE PREFERRED EMBODIMENT

Figure 3:
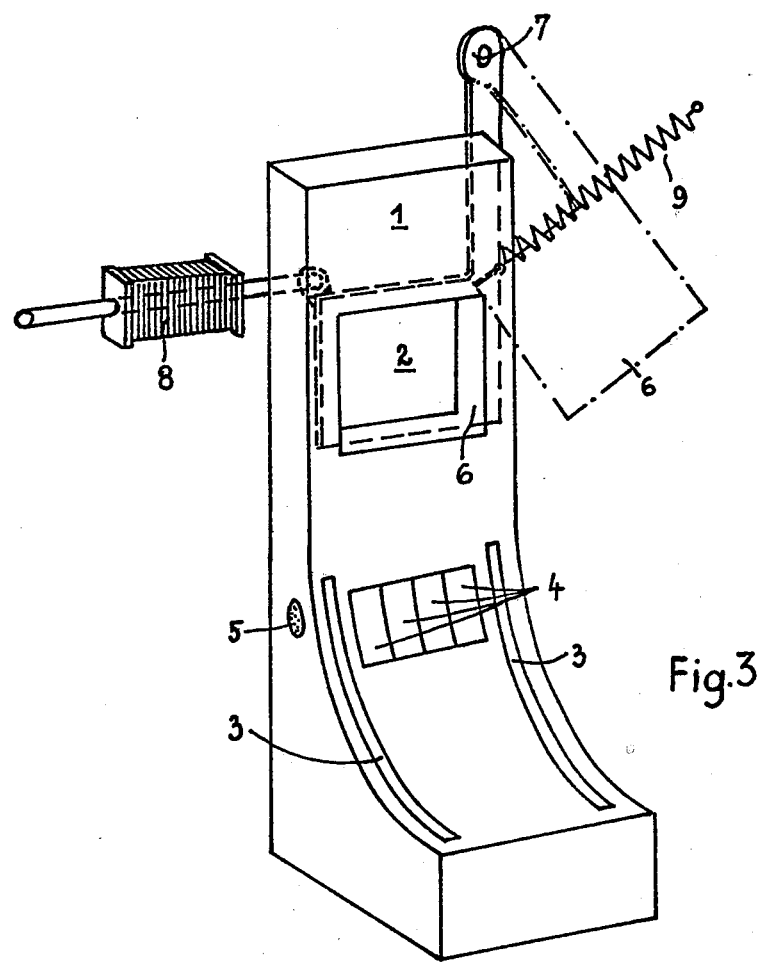
FIG. 3 is a schematic front view of the front film stage of a moving picture camera and FIG. 4 is a front view of an apertured disc for generating timing signals having the frequency of the pictures.
Figure 4:
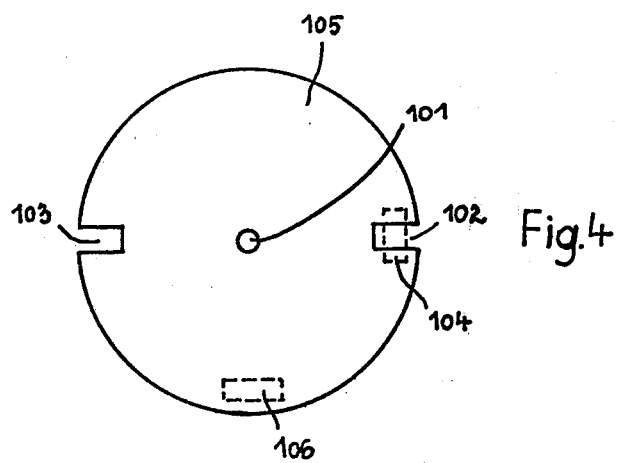

In FIG. 3, the front film stage of a moving picture camera is designated 1. The aperture past which the film is advanced stepwise (frame by frame) is 2. Aperture 2 may be covered by a shutter 6. Shutter 6 is pivotally mounted at 7 and may be pulled in front of the aperture by a solenoid 8 against the bias of a spring 9 from the position shown in chain-dotted lines into the position shown in broken lines. At a distance of, for example, one picture frame from aperture 2, a total of four optical-electronic indicating elements 60, 61, 62, 63 for a claw system are arranged between claw channels 3, 4. These indicating elements are peferably seven-segment indicating elements as used, for example, in electronic pocket calculators. These elements are affixed to the film stage by means of a bedplate, the associated connections are made, for example, by means of a schematically shown plug 5 to encoding switches 70, 71, 72, 73 arranged on the operating panel of the camera and not further illustrated, as well as to a driving circuit 50 arranged in the control part of the camera. The invention is not limited to the indicating elements being arranged at a distance of one picture frame from aperture 2. This distance may be varied as long as a sharp, frame-by-frame exposure of the film material is assured.

Figure 1:
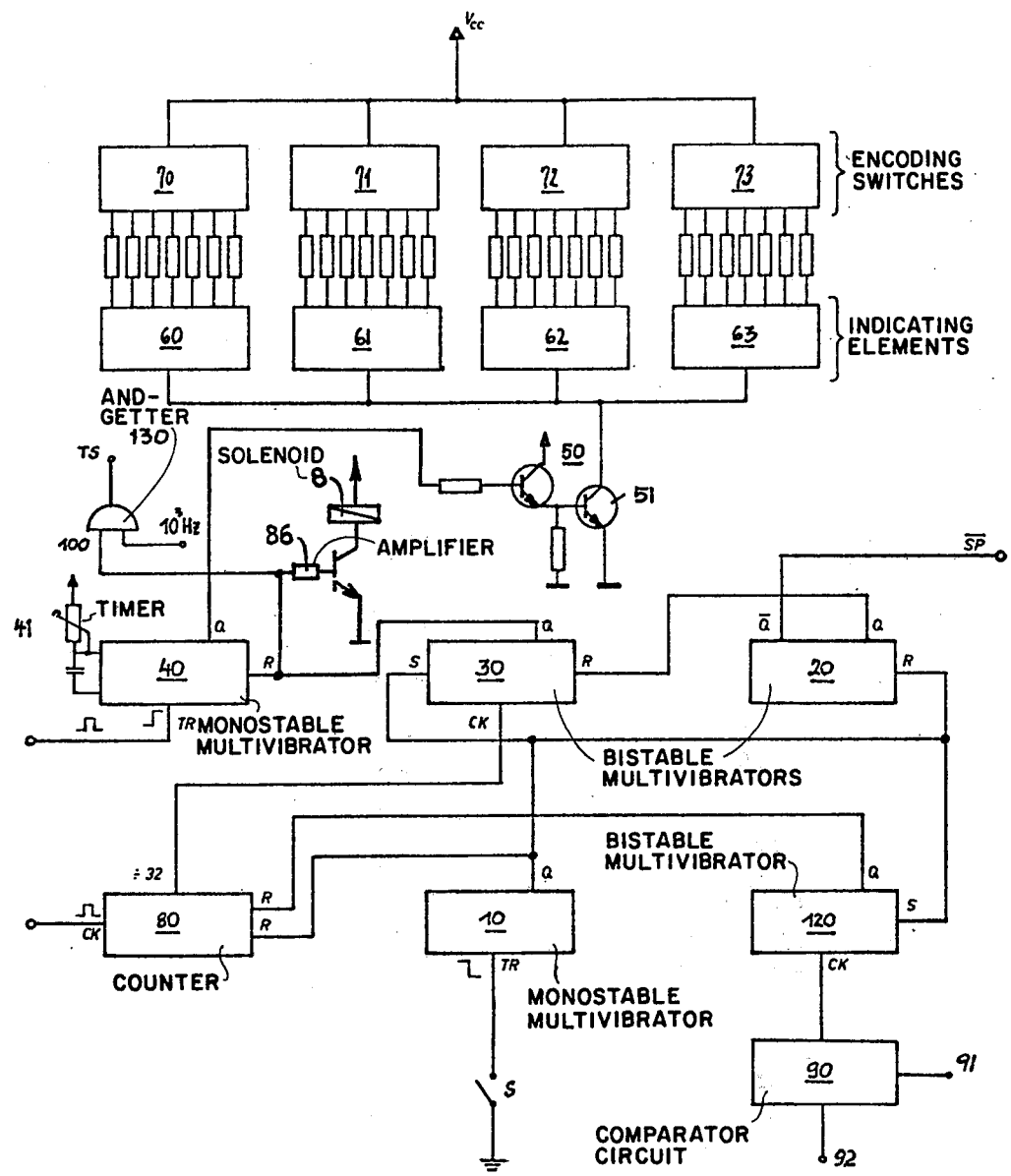
FIG. 1 schematically shows the circuit diagram of an electronic circuit arrangement for optical-electronic indicating elements of an apparatus according to the invention.

In the embodiment of the circuit arrangement for the control of the optical-electronic indicating elements according to the invention illustrated in FIG. 1, the control circuit proper consists of a monostable multivibrator 10 associated with a button switch S, a bistable start-stop multivibrator 20 controlled by multivibrator 10 and a bistable multivibrator 30 set by multivibrator 20 and actuated by the output signal of monostable multivibrator 10, as well as a monostable multivibrator 40 which is set by the output signal of multivibrator 30 and is timed by signals having the picture frequency.

The output of this multivibrator 40 is connected to the input of a driving stage 50 for the indicating elements.

Furthermore, a blocking circuit is provided which permits the control circuit to be automatically de-energized when a preselectable number of frames has been filmed after the desired picture frequency has been reached. This blocking circuit consists of a comparator circuit 90 which compares the desired picture frequency with the actual picture frequency. The output of this comparator circuit is connected via a bistable multivibrator 120 to a reset input of a counter 80 to whose other reset input the output of monostable multivibrator 10 is connected. Signals having the picture frequency are connected to the timing input of this counter 80; the output of this switch is connected with the timing input of bistable multivibrator 30.

The operation of this circuit is explained in detail hereinafter.

Figure 2:
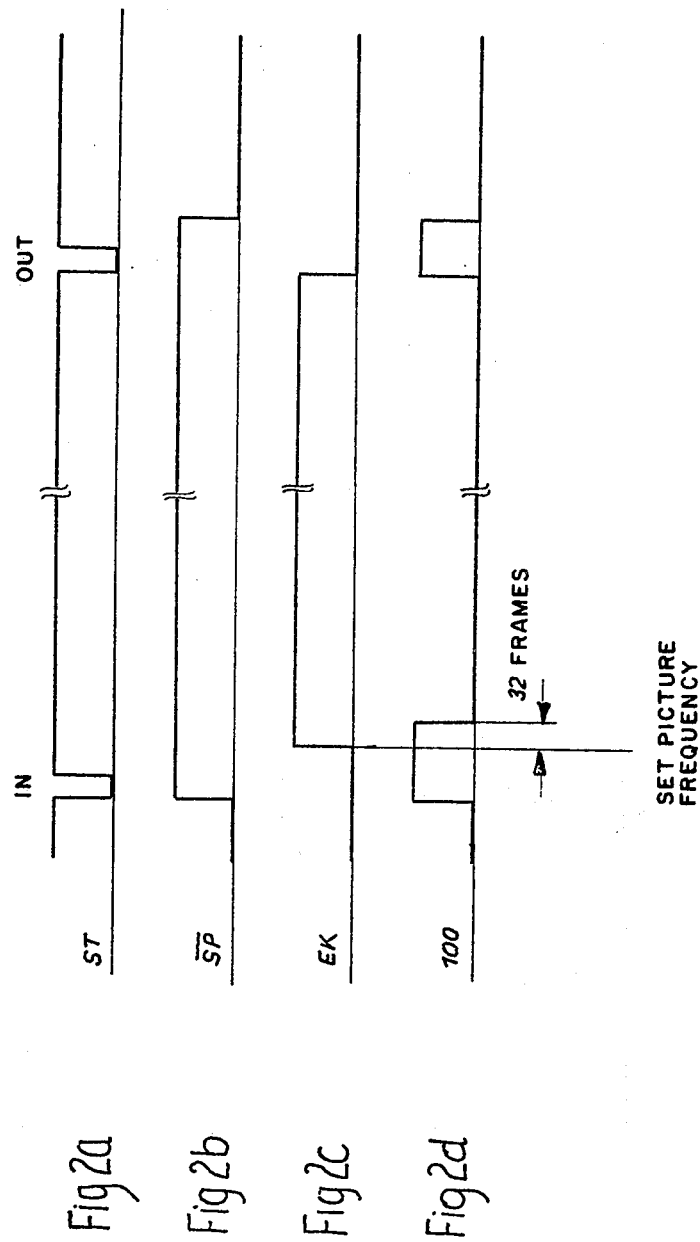
FIGS. 2a, 2b, 2c and 2d show the curves of the potential at a few points of the circuit according to FIG. 1.

Switch S is briefly depressed to set the camera in operation and this causes the TR-input of monostable multivibrator 10 to be briefly grounded. The curve of the potential at this input is shown in FIG. 2a. This negative pulse flank triggers monostable multivibrator 10, its Q-output becomes "high". This Q-output is connected to the R-input of bistable multivibrator 20, which is triggered so that its $\bar{Q}$ becomes "high" and its Q-output becomes "low". A control for the motor drive of the camera is connected to the $\bar{Q}$-output (SP output of the circuit) and this sets the motor in motion, controlled by this positive pulse ($\bar{Q}$-high). FIG. 2b illustrates the potential curve at this $\bar{Q}$-output.

The Q-output of bistable multivibrator 20 is connected to the R-input of further bistable multivibrator 30 and, when the R-input becomes "low", the signal condition connected to the set-input S becomes effective, which is "high" in the present case. The timing input CK of bistable multivibrator 30 is "low" and, therefore, the Q-output of 30 will assume the "high" condition.

This pulse is connected to an $\bar{R}$-input of a monostable multivibrator 40. Furthermore, this pulse is connected to one input 100 of an AND-getter 130 and transmits a sound signal, which is connected to another input of the AND-getter, to the output B of the AND-getter. A sound recording instrument which records the sound signal is connected to this output. This recorded sound signal constitutes the "shutter knock", if desired, the sound recording instrument may also be set in operation by this sound signal. But this pulse is also connected to the input of a transistor amplifying stage 86 in whose collector circuit the energizing coil of pull magnet 8 is arranged. Thus, when the base of 86 becomes "high", transistor 86 transmit, magnet 8 is energized and shutter 6 is pulled against the bias of spring 9 in front of aperture 2.

Multivibrator 40 is connected for a period of time adjustable by a timing element 41, i.e. its Q-output is "high", only when its TR-input is connected with a positive pulse flank. These positive pulses (pulse flanks) are generated by sensors, for example light barriers, which cooperate with an apertured disc 105 coupled to camera motor shaft 101. This disc has two slits 102 and 103 relatively displaced by 180° and makes one half turn per picture frame. When a picture frame appears in the aperture of the camera, a sensor 104 (light barrier) is operated by one of the two slits, which generates a pulse which is transmitted to the TR-input of monostable multivibrator 40 and switches it on; $\bar{R}$ is "high" because the multivibrator 30 is switched on. The ascending pulses at the Q-output of 40 control driving stage 50 so that transistor 51 connects indicating elements 61 to 63 to the voltage source and they light up with an indication corresponding to their pre-adjustment. The indicating elements light up for a period of time determined by a timing element 41, for instance an RC-element, and are switched on again by the positive flank of the succeeding timing pulse. The pre-adjustment is made by encoding switches 70, 71, 72, 73 which are arranged on the operating panel of the camera. One encoding switch is associated with each indicating element. These indicating elements preferably are seven-segment indicating elements, for example of the type TLR 301 of Toshiba, but the invention is not limited to indicating elements of this kind; alternatively point matrix indications with corresponding encoding switches may be used, for example.

Mechanical structural parts may also be used as indicating elements, which mark the film.

These indicating elements will thus always light up or will be actuated and expose a picture frame when a picture frame is in the aperture and an optical-electronic element 104 is exposed.

This will not occur with the selected picture frequency at the start of filming but with a lower frequency. Therefore, the film is over-exposed. In the interest of a dependable recognizable reproduction of the information focused through the indicating elements, the focusing must be effected for a predetermined period of time during which the pre-adjusted picture frequency has been reached. For this purpose, a comparator circuit 90 is provided, to which a signal proportional to the pre-selected standard picture frequency is connected at 91, on the one hand, and a signal corresponding to the actual picture frequency is connected at 92, on the other hand. For instance, such a signal may be generated in digital form by receiving the rotational speed of the camera by an optocoupler and counting the rotations. The signal corresponding to the standard picture frequency may then be set, for example, by adjusting the BCD-encoding switch.

When comparator circuit 90 determines identity of the two signals, the output of comparator circuit 90 becomes "high". FIG. 2c illustrates the potential curve at the output of the comparator circuit. The positive flank of this pulse transmitted to the timing input of bistable multivibrator 120 triggers this multivibrator so that its output becomes "low".

The set-input S of this multivibrator 120 is connected with the Q-output of multivibrator 10; meanwhile, switch S has been opened again (the operating pulse terminated), this Q-output (and thus the S-input of multivibrator 120) is "low".

The Q-output of multivibrator 120 is connected to an R-input (reset-input) of counter 80. Counter 80 is the type of counter which emits an output signal after a pre-adjustable number of input signals when the signal conditions connected to two reset inputs are low. The one reset input is connected to the output of monostable multivibrator 10 which, after switch $S_1$ has been opened again, has the signal condition "low". The other reset input is—as has been described hereinabove—"low" when the standard picture frequency has been reached. Thus, starting with this circuit condition, counter 80 counts the timing signals at its input which are generated by a sensor 106, for example a light barrier, which coooperates with disc 105 and is arranged 90° displaced from sensor 104. This sensor 106 is controlled during the transport stage of the film and transmits a pulse to the CK-input of counter 50.

The counter 80 is so wired that its output becomes "high" after 32 pulses have been counted. The timing input of multivibrator 30 is connected with this output. In this manner, the Q-output of the same becomes "low", the sound track control is switched off, magnet 8 becomes de-energized and aperture 2 is exposed, monostable multivibrator 40 is blocked and remains "low", transistor 51 disconnects the voltage source conductor, the indicating elements are deactivated and do not light up again during the reset of the filming.

When the moving picture camera is disconnected, switch S is depressed again, output Q of monostable multivibrator 10 becomes "high" and the associated pulse flank sets bistable multivibrator 30. The Q-output of 30 and thus the $\bar{R}$-input of 40 becomes "high" so that 40 is triggered by the positive flank of the succeeding timing pulse and its Q-output becomes "high" for the period of time defined by timing element 41. Driving stage 50 and, therefore, the indicating elements, too, are thereby switched on.

Since the Q-output of 30 becomes "high", AND-getter 130 transmits the sound signal to the sound recording instrument connected to the output; these sound signals marked at the end make it possible to synchronize picture and sound "at the end".

The motor is stopped or disconnected simultaneously with the actuation of switch S.

When the motor is stopped, bistable multivibrator 20 is reset by a stop signal.

I claim:

1. An accessory apparatus for producing visible information on a film in a moving picture camera having a standard picture frequency by exposure of the film through optical indicating elements, which comprises an actuating circuit arrangement for the optical indicating elements, the circuit arrangement including a driving circuit for actuating the indicating elements and a control circuit associated with the driving circuit, the driving circuit being responsive to the control circuit and the control circuit being controllable in response to the picture frequency, the control circuit comprising an electrical signal transmitting stage, a signal recording stage connected to the transmittting stage and directly receiving the signal therefrom, the driving circuit and the signal transmitting stage being energizable simultaneously, and a blocking circuit stage de-energizing the control circuit after passage of a pre-selectable number of picture frames after the standard picture frequency has been reached.

2. The accessory apparatus of claim 1, wherein the control circuit comprises a bi-stable multivibrator connected to the signal transmitting stage and to the driving circuit, and a monostable multivibrator, the monostable multivibrator being connected between the bistable multivibrator and the driving circuit and being set by the bistable multivibrator, and the monostable multivibrator being timed by signals having the frequency of the pictures.

3. The accessory apparatus of claim 2, wherein the blocking circuit includes a comparator circuit receiving a signal corresponding to the actual picture frequency and to the desired picture frequency, and emitting a comparison signal derived from the received signals, and a counter circuit controlled by the comparison signal, the counter circuit having an output applied to the bistable multivibrator of the control circuit.

4. The accessory apparatus of claim 1, wherein the moving picture camera comprises a shutter for closing the aperture of the camera and an actuating element for the shutter, and the circuit arrangement includes a circuit emitting control signal transmitted to the actuating element.

* * * * *